US008863882B2

(12) United States Patent
Landoll et al.

(10) Patent No.: US 8,863,882 B2
(45) Date of Patent: *Oct. 21, 2014

(54) HYDRAULIC STEERING SYSTEM FOR FORKLIFT TRUCKS

(71) Applicants: Donald R. Landoll, Marysville, KS (US); Mel A. Beikmann, Hanover, KS (US); Shannon W. Gibson, Marysville, KS (US)

(72) Inventors: Donald R. Landoll, Marysville, KS (US); Mel A. Beikmann, Hanover, KS (US); Shannon W. Gibson, Marysville, KS (US)

(73) Assignee: Landoll Corporation, Marysville, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 13/633,711

(22) Filed: Oct. 2, 2012

(65) Prior Publication Data

US 2013/0039729 A1 Feb. 14, 2013

Related U.S. Application Data

(63) Continuation-in-part of application No. 12/962,444, filed on Dec. 7, 2010, now Pat. No. 8,276,704.

(51) Int. Cl.
| | | |
|---|---|---|
| B62D 53/02 | (2006.01) |
| B62D 5/14 | (2006.01) |
| B62D 12/00 | (2006.01) |
| B66F 9/10 | (2006.01) |
| B66F 9/075 | (2006.01) |

(52) U.S. Cl.
CPC ......... *B62D 5/14* (2013.01); *B62D 12/00* (2013.01); *B66F 9/105* (2013.01); *B66F 9/07568* (2013.01)
USPC .......................................... 180/235; 180/418

(58) Field of Classification Search
USPC .................................. 180/418, 235; 414/633
See application file for complete search history.

(56) References Cited

U.S. PATENT DOCUMENTS

| | | | |
|---|---|---|---|
| 3,039,268 A | 6/1962 | Shaffer |
| 3,608,761 A | 9/1971 | Taylor |
| 3,856,152 A | 12/1974 | Parrett et al. |

(Continued)

FOREIGN PATENT DOCUMENTS

EP 0303413 2/1989

OTHER PUBLICATIONS

"International Search Report and Written Opinion", PCT/US2012/022949, (May 7, 2012).

*Primary Examiner* — Tony Winner
(74) *Attorney, Agent, or Firm* — Law Office of Mark Brown, LLC; Mark E. Brown; Christopher M. DeBacker

(57) ABSTRACT

A hydraulic steering actuator system for a forklift with front and rear sections includes a hydraulic steering motor. The forklift front section includes a mast mounting a pair of fork blades and a pair of wheels. The forklift rear section mounts a pair of drive wheels. The forklift front and rear sections are connected by an articulated connection with a vertical rotational axis. The steering actuator motor driveshaft extends along the vertical rotational axis. First and second actuator mounting brackets are connected to the forklift front and rear sections respectively. One of the mounting brackets includes upper and lower locking assemblies locking the hydraulic steering motor driveshaft whereby torque applied to the steering motor is transmitted to the articulated connection for turning the forklift front section relative to the forklift rear section. The range of motion is preferably 180°-205° for accommodating side-loading operations from relatively high storage shelves.

5 Claims, 17 Drawing Sheets

(56) References Cited

U.S. PATENT DOCUMENTS

| | | |
|---|---|---|
| 4,024,968 A | 5/1977 | Shaffer et al. |
| 4,828,066 A | 5/1989 | Hayashi |
| 5,312,219 A | 5/1994 | Brown |
| 7,117,962 B2 | 10/2006 | Moffett et al. |
| 8,002,074 B2 * | 8/2011 | Roose .......................... 180/418 |
| 2003/0184045 A1 | 10/2003 | Callan |
| 2004/0112666 A1 | 6/2004 | McVicar et al. |
| 2011/0262254 A1 | 10/2011 | Brown |

* cited by examiner

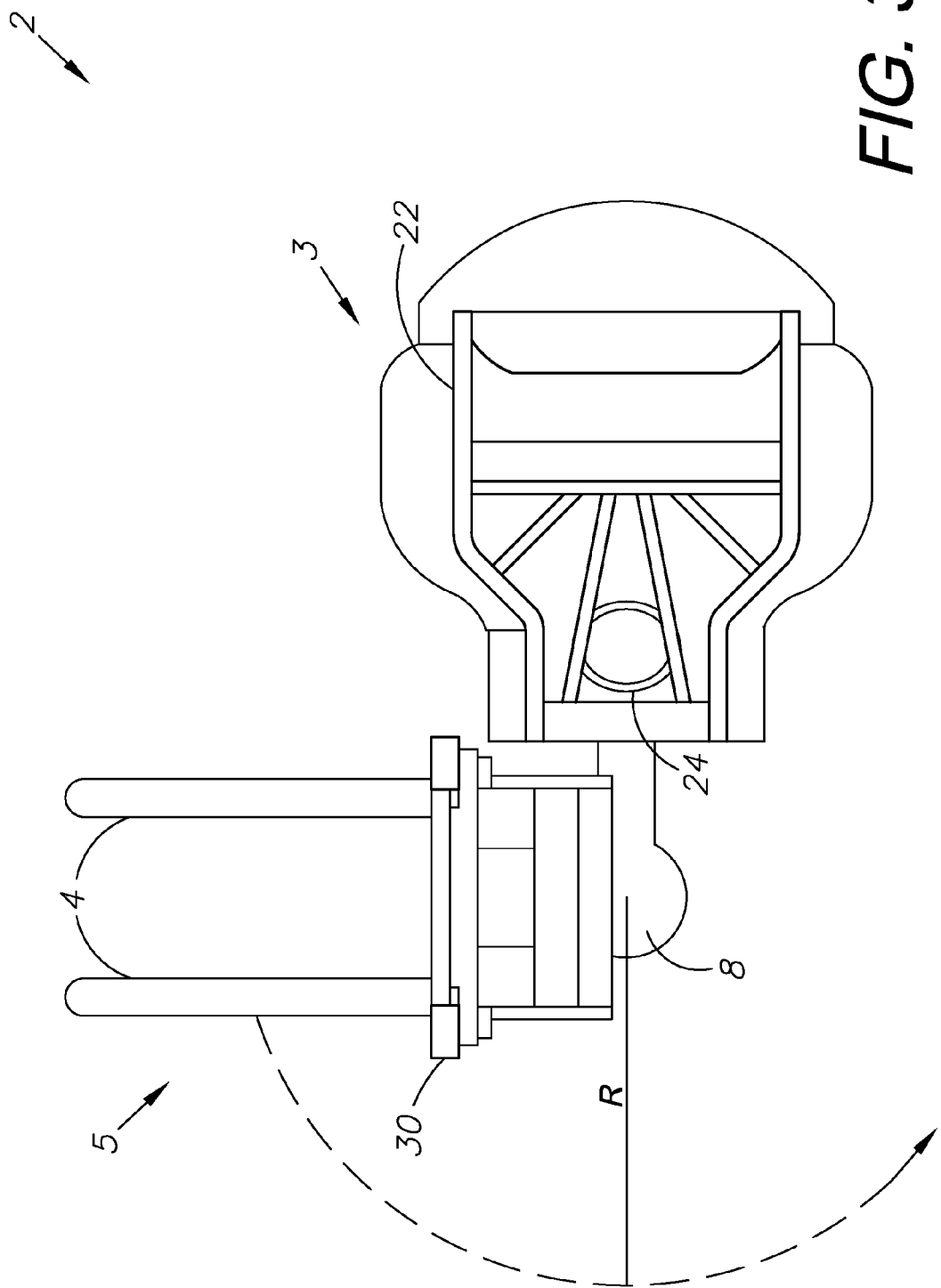

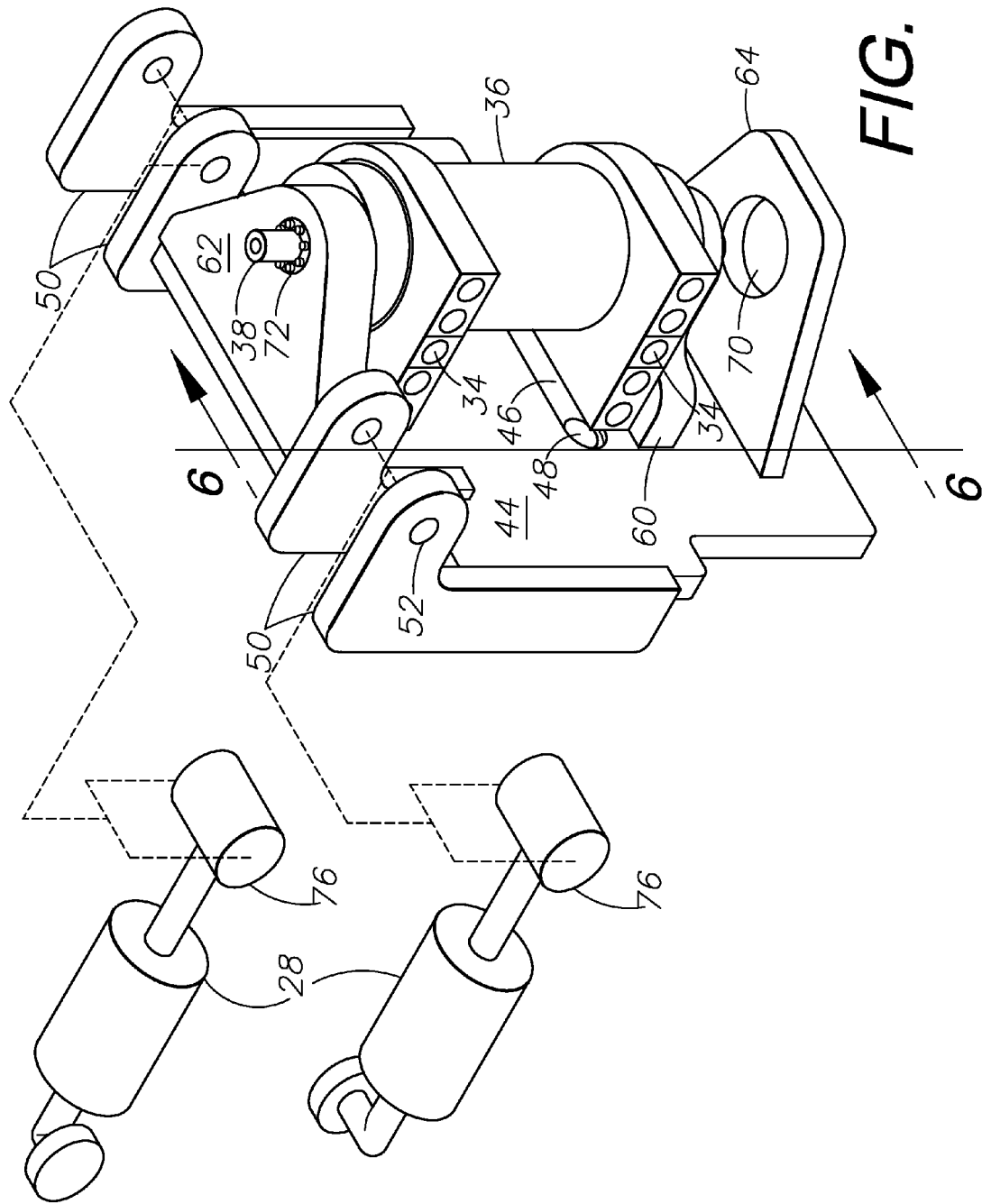

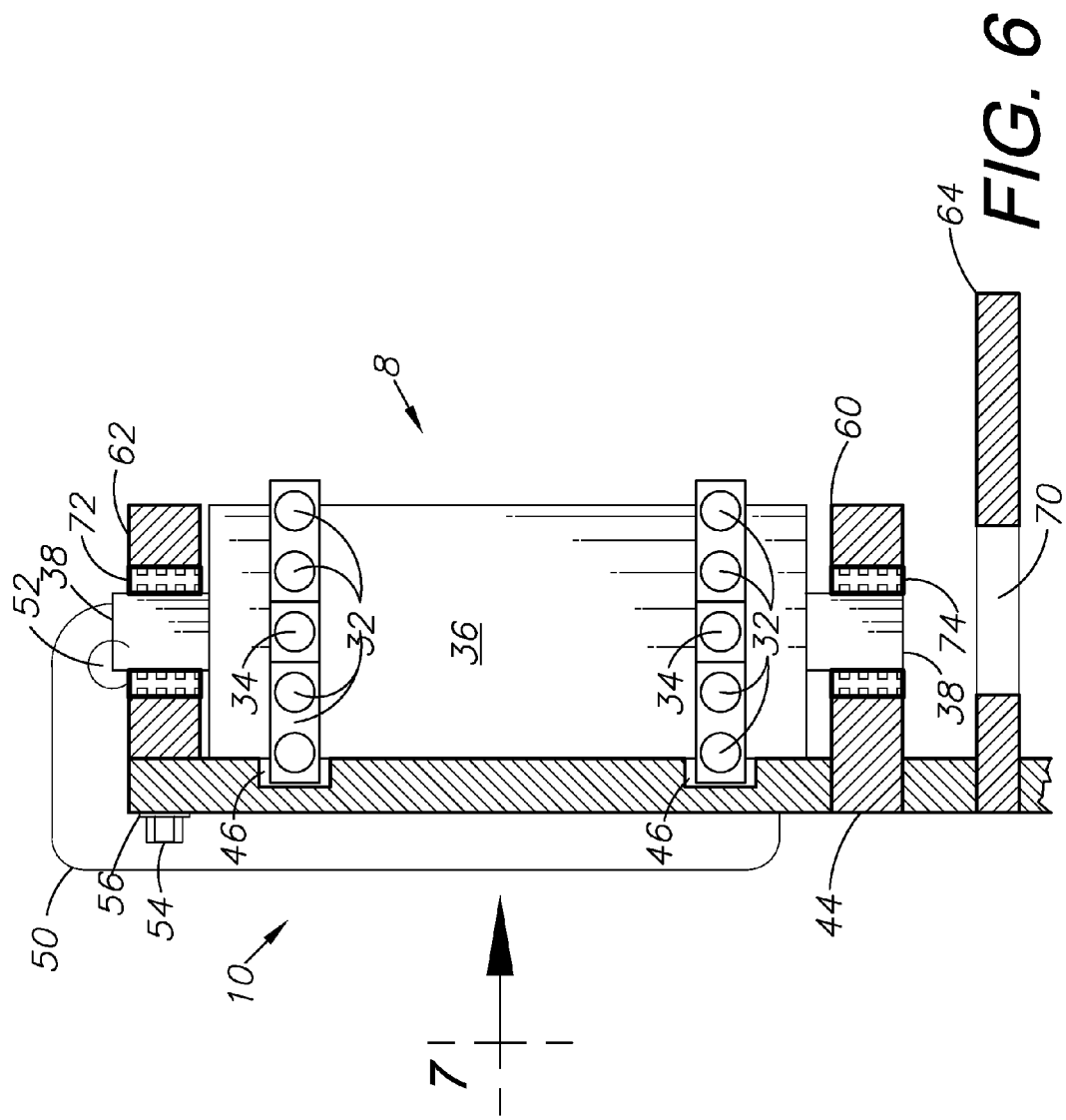

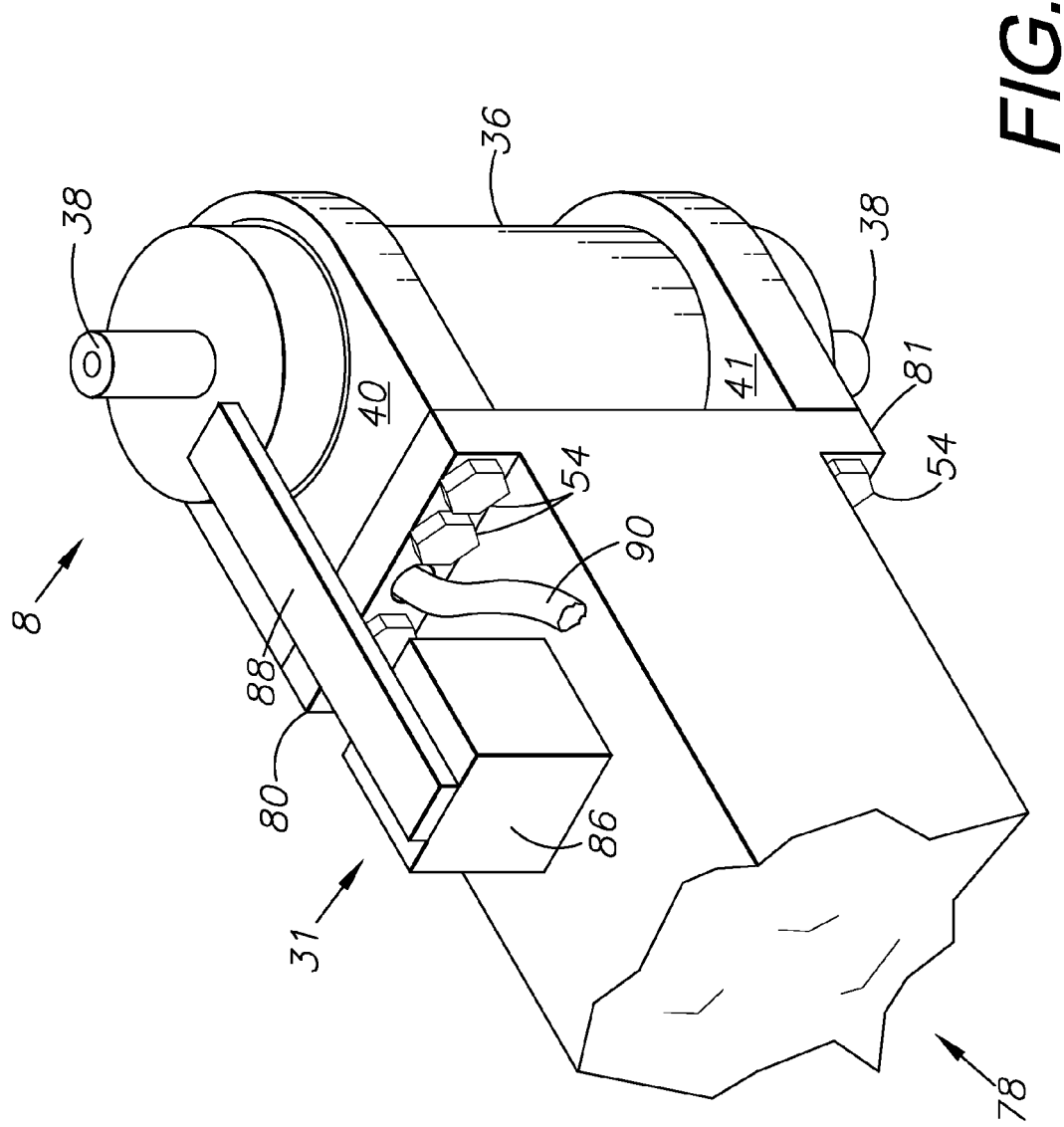

HYDRAULIC STEERING SYSTEM FOR FORKLIFT TRUCKS

CROSS-REFERENCE TO RELATED APPLICATION

This application is a continuation-in-part of and claims the benefit of U.S. patent application Ser. No. 12/962,444, filed Dec. 7, 2010, now U.S. Pat. No. 8,276,704, which is incorporated herein by reference.

BACKGROUND OF THE INVENTION

1. Field of the Invention

The present disclosed technology relates generally to a system for steering and operating forklift trucks, and more specifically to steering and operating a narrow-aisle, articulated forklift truck using a hydraulic actuator.

2. Description of the Related Art

A typical narrow-aisle articulated forklift truck (or "forklift") comprises front and rear chassis sections each having a pair of wheels on a respective common axis. The rear wheels provide drive-motion to the forklift truck, while the front wheels are non-driven and steer the truck. The chassis sections are pivoted together about a vertical axis so that the front chassis section, including a mast, can be turned at an angle of approximately 90° each way (preferably 180°-205° total range of movement) relative to the rear chassis section to allow the truck to insert loads into, and remove loads from, the faces of the aisle.

Without limitation on the generality of useful applications of the present invention, an exemplary use consists of loading and unloading palletized inventory in narrow-aisle facilities, such as warehouses. Steering with the front wheels is generally preferred for such applications because rear-wheel steering forklifts generally have relatively large turning radii and are thus ill-suited for loading and unloading storage bins in narrow aisles, such as those found in many warehouses and other storage facilities. Narrow-aisle, articulated forklift trucks, on the other hand, allow the mast-portion of the forklift to turn independently from the body of the truck, which allows the operator to load or unload material positioned perpendicular to the aisle along which the truck is traveling. Typical narrow-aisle trucks are capable of rotating the front chassis mast section at least 90° each way relative to a direction of travel along a warehouse shelf aisle.

A problem condition associated with many previous articulated forklift trucks is the articulating joint between the front and rear chassis sections. An electric or hydraulic motor is typically used to steer the forklift truck by rotating the front chassis section relative to the rear section. Because the front chassis includes the mast, which is subjected to heavy loads, the rotation motor and connection are high-wear components which can be expensive to replace. What is needed is an articulated forklift truck capable of maneuvering in narrow aisles and handling heavy loads while minimizing the wear on the articulating component of the truck.

Heretofore there has not been a forklift truck embodying the capabilities of the invention presented herein.

SUMMARY OF THE INVENTION

Disclosed herein in an exemplary embodiment is a narrow-aisle articulated forklift truck including front- and rear-chassis portions. A hydraulic actuator capable of allowing rotation through approximately 180°-205° joins the two portions and is capable of absorbing the high-wear forces of loads applied to the front-chassis portion.

The hydraulic actuator provides a connection between the front and rear chassis portions, allows the front-chassis portion to rotate about the actuator, and provides a means for hydraulic power to pass through the actuator to the forklift truck mast, allowing the mast to tilt and the fork to raise and lower while protecting the hydraulic hoses.

BRIEF DESCRIPTION OF THE DRAWINGS

The drawings constitute a part of this specification and include exemplary embodiments of the disclosed subject matter illustrating various objects and features thereof, wherein like references are generally numbered alike in the several views.

FIG. 3 is a top-down plan view of the preferred embodiment of the present invention demonstrating the rotational capabilities of the front-chassis portion.

FIG. 5B is another isometric view of the hydraulic actuator and the mounting bracket shown in FIG. 5A.

FIG. 6 is a sectional view of the hydraulic actuator taken generally a long line 6-6 in FIG. 5B.

FIG. 8B is an isometric view of the hydraulic actuator and mounting block of FIG. 8A.

DETAILED DESCRIPTION OF THE PREFERRED EMBODIMENTS

I. Introduction and Environment

Figure 1:
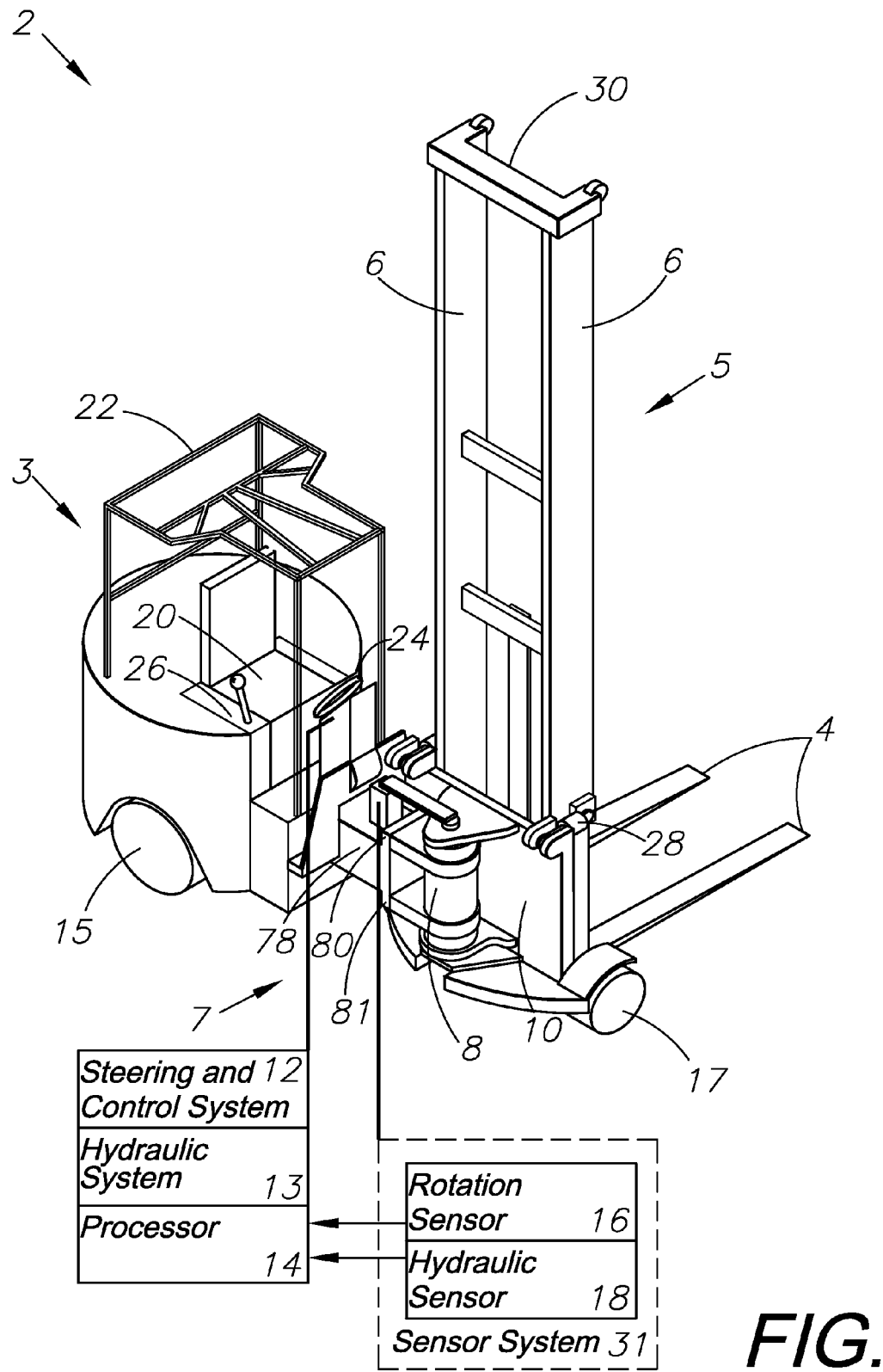
FIG. 1 is an isometric view of an articulated forklift with a hydraulic steering actuator comprising a preferred embodiment of the present invention.

As required, detailed aspects of the disclosed subject matter are disclosed herein;

however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as oriented in the view being referred to. The words "inwardly" and "outwardly" refer to directions toward and away from, respectively, the geometric center of the embodiment being described and designated parts thereof. Forwardly and rearwardly are generally in reference to the direction of travel, if appropriate. Said terminology will include the words specifically mentioned, derivatives thereof and words of similar meaning A preferred embodiment of the present invention is an articulating forklift truck 2 comprised of a front-chassis portion 5 and a rear-chassis portion 3. The forklift truck 2 is designed to operate along narrow aisles by loading inventory or items located perpendicular to the forklift truck's path. The front-chassis portion 5 and the rear-chassis portion 3 are joined at a pivot point formed by a hydraulic actuator 8 bolted to a mounting block 78 and a mounting bracket 10. An example of a suitable hydraulic actuator 8 includes the T20 Series Hydraulic Actuator manufactured by Helac Corporation of Enumclaw, Washington. Such a hydraulic actuator 8 operates as a complete steering and bearing system in a single, rugged component. The actuator 8 is adapted for handling the high-wear loads placed upon it when inventory is lifted by the forklift truck 2.

II. Articulating Forklift Truck 2

Referring to the drawings in more detail, the reference numeral 2 generally refers to the articulating forklift truck used for loading and unloading inventory along narrow aisles. Articulating forklift trucks are used in such circumstances because the front-chassis portion 5 of the forklift truck 2 is capable of rotating 90° or more to the right or the left of the path traveled by the forklift truck. The forklift mast 6 and the fork blades 4 are mounted to the front-chassis portion 5 and, when rotated, can lift or unload inventory without adjusting the travel path of the forklift truck 2.

Figure 2:
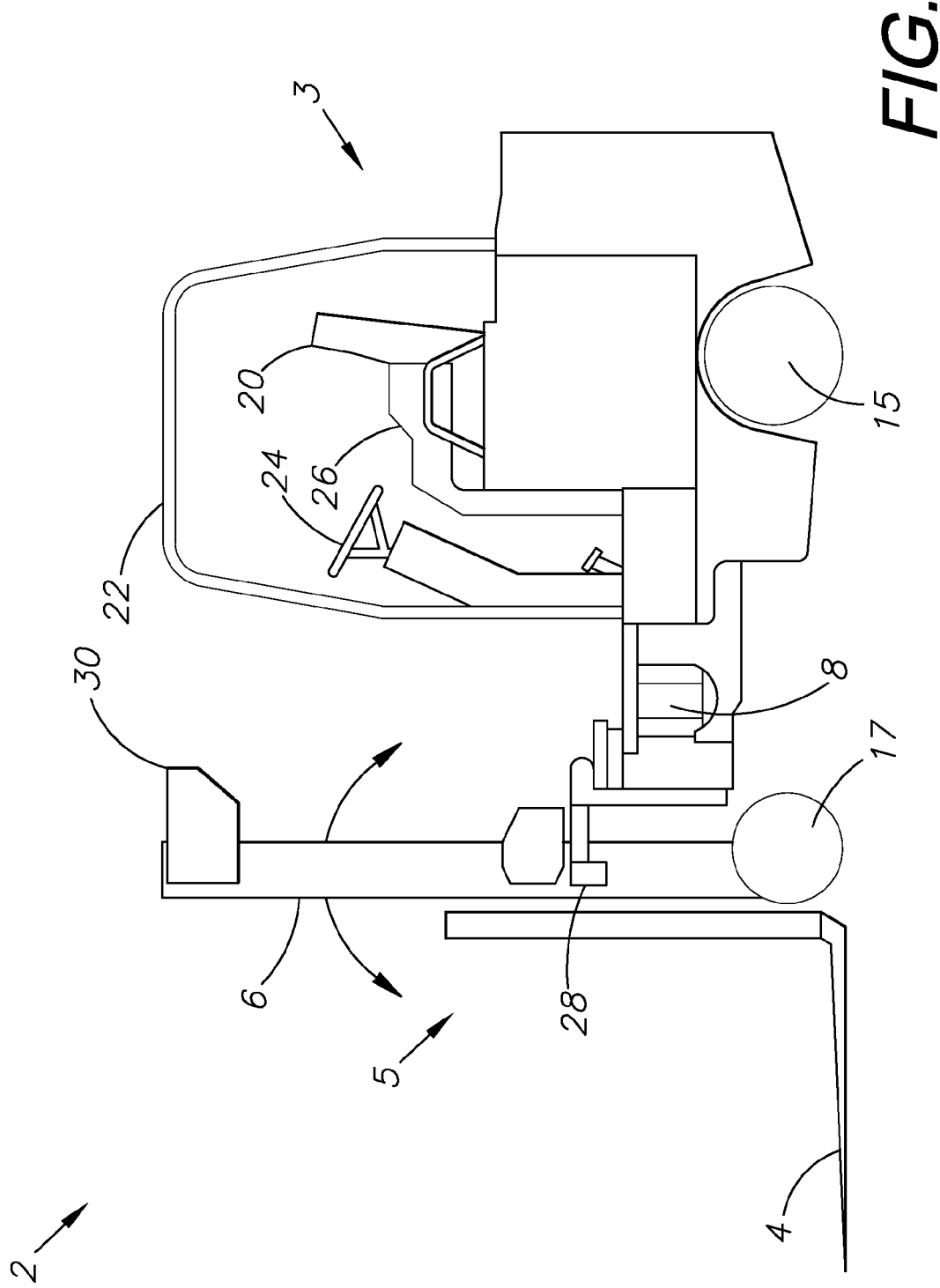
FIG. 2 is a side elevational view of the preferred embodiment of the present invention.

FIGS. 1-3 generally show an articulating forklift truck 2 in a preferred embodiment, including the front-chassis portion 5 and the rear-chassis portion 3. The rear-chassis portion 3 is further comprised of an operator's seat 20, a roll cage 22, steering controls (steering wheel) 24 and mast and fork controls 26. A mounting block 78 with upper and lower mounting flanges 80, 81 is located below the operator's seat 20 and the steering controls 24. A steering and control subsystem 12, a hydraulic subsystem 13, and a computer processer 14 are mounted within the rear-chassis 3 for coordinating control signals from the operator to the forklift truck 2. For example, the hydraulic steering and control subsystem 12 can differentially drive the rear wheels 15 for effectively operating the forklift 2 in a zero turning radius ("ZTR") mode of operation. Thus, the forklift front portion 5 can be advanced towards a line of shelves even when the front wheels 17 are turned at 90° right angles to the longitudinal axis. The control subsystem 12 can automatically meter hydraulic fluid to the steering actuator 8 and otherwise control the drive train of the forklift 2 in various operating modes, such as straight-line driving, turning and store-and-retrieve warehouse shelving procedures.

The front-chassis portion 5 is further comprised of a mast 6 and forks 4 vertically adjustably mounted thereon. A fork cable assembly 30 is mounted atop the mast 6 and connected to the forks 4. The cable assembly 30 is controlled via the fork controls 26 and is capable of raising and lowering the fork 4 along the mast 6. A mounting bracket 10 is connected to the rear of the mast 6. Two mast tilt hydraulic cylinders 28 are mounted on either side of the mounting bracket 10 and connected to the mast 6. The tilt cylinders 28 allow the mast 6 to be tilted forward or backwards, allowing positioning of the forks 4.

A central portion 7 joins the front-chassis portion 5 to the rear-chassis portion 3. The central portion 7 is comprised primarily of a hydraulic actuator 8 bolted to the mounting block 78 and the mounting bracket 10. A sensor system 31 is attached to the mounting block 78 and the hydraulic actuator 8 and includes a rotation sensor 16 for determining the rotation degree of the front-chassis portion 5 relative to the rear-chassis portion 3, and a hydraulic sensor 18 for determining the tilt of the mast, along with the other hydraulic functions of the forklift truck 2.

As shown in FIG. 3, the front-chassis portion 5 is rotatable about the hydraulic actuator 8. The rotation radius R indicates the rotational path of the front-chassis portion 5 as it rotates about the hydraulic actuator 8. The rotation path allows for at least a 90° rotation of the front-chassis portion 5 to either side of the forklift truck 2 longitudinal axis.

Figure 4A:
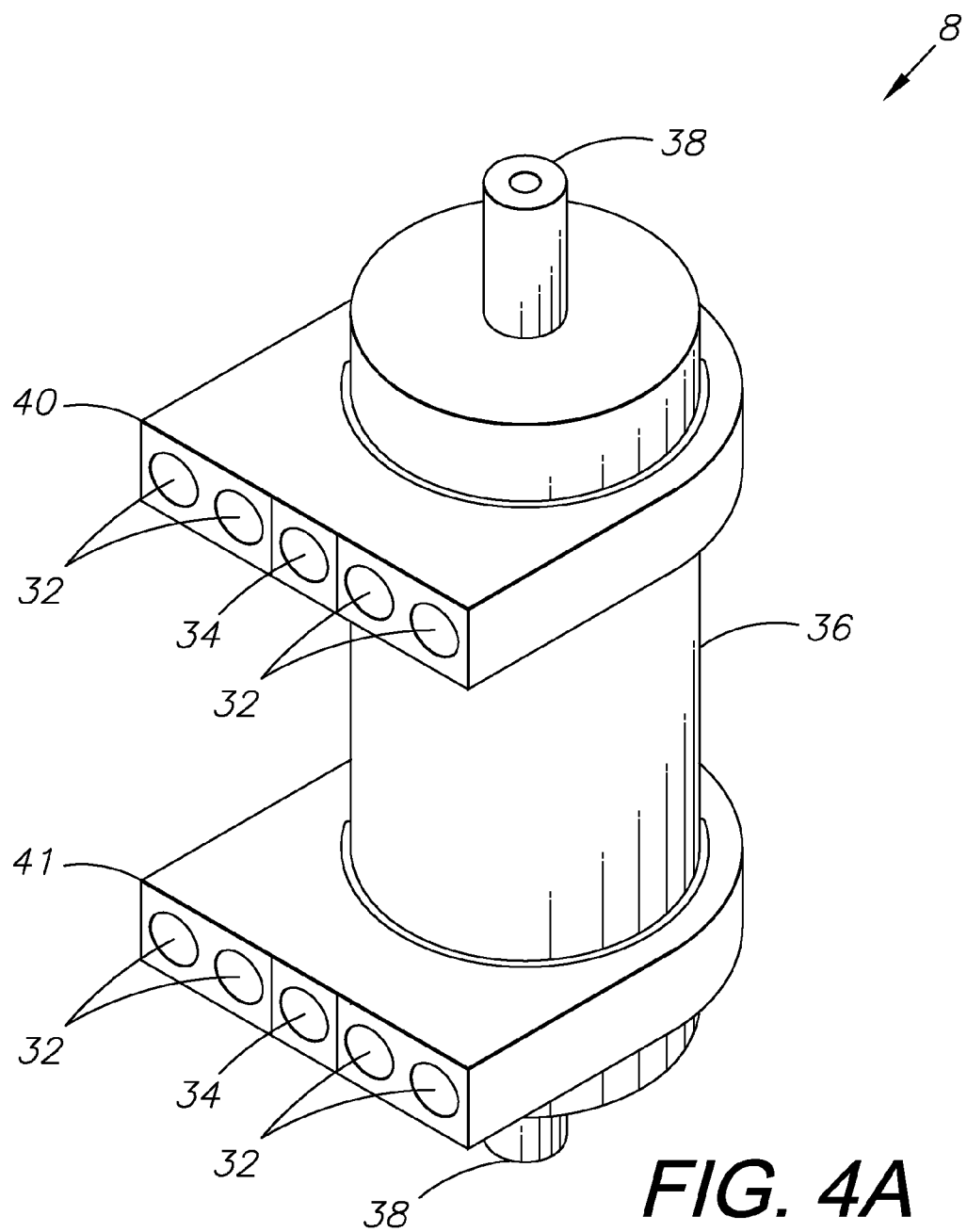
FIG. 4A is an isometric view of the hydraulic steering actuator.
Figure 4B:
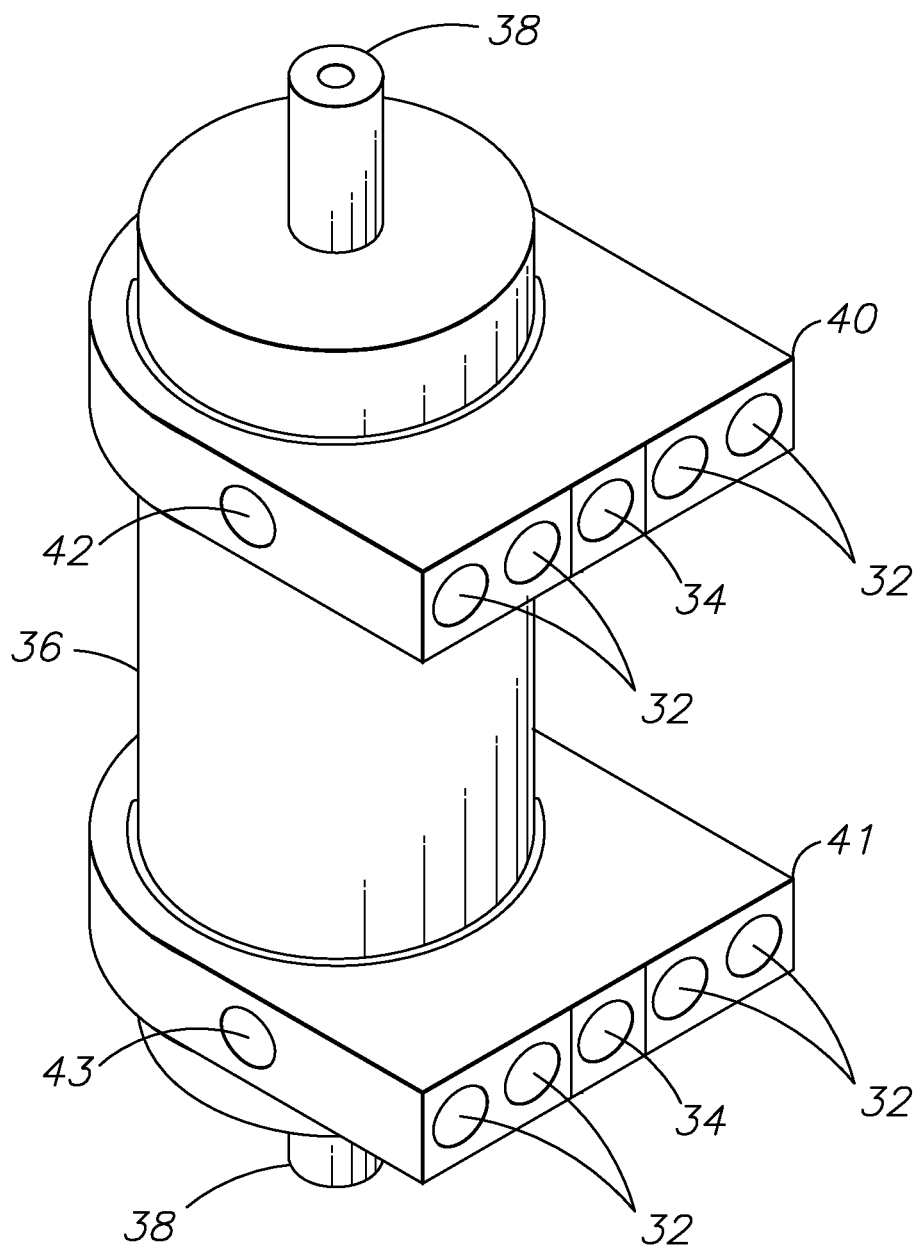
FIG. 4B is another isometric view of the hydraulic steering actuator.

FIGS. 4A and 4B show the hydraulic actuator 8 in more detail. The actuator 8 is comprised of an actuator body 36, an actuator upper flange 40, a lower flange 41, and a rotator shaft 38. Each actuator flange 40, 41 includes a hydraulic inlet/outlet port 34 and a plurality of bolt holes 32. The bolt holes 32 allow the actuator 8 to be physically bolted to the mounting block 78 via a plurality of mounting bolts 54.

The upper actuator flange 40 includes a first port 42, and the lower actuator flange 41 includes a second port 43. The first and second ports 42, 43 include plugs which can be loosened and tightened to adjust the rotation angle of the actuator. When constructing the forklift truck 2, the plugs located in the first and second ports 42, 43 are loosened. The actuator 8 is rotated 90° so that it is perpendicular to the mounting bracket 10. The plugs located in the first and second ports 42, 43 are then re-tightened. This allows the forklift front chassis portion 5 to rotate through 180° or more for sideloading capability.

Figure 5A:
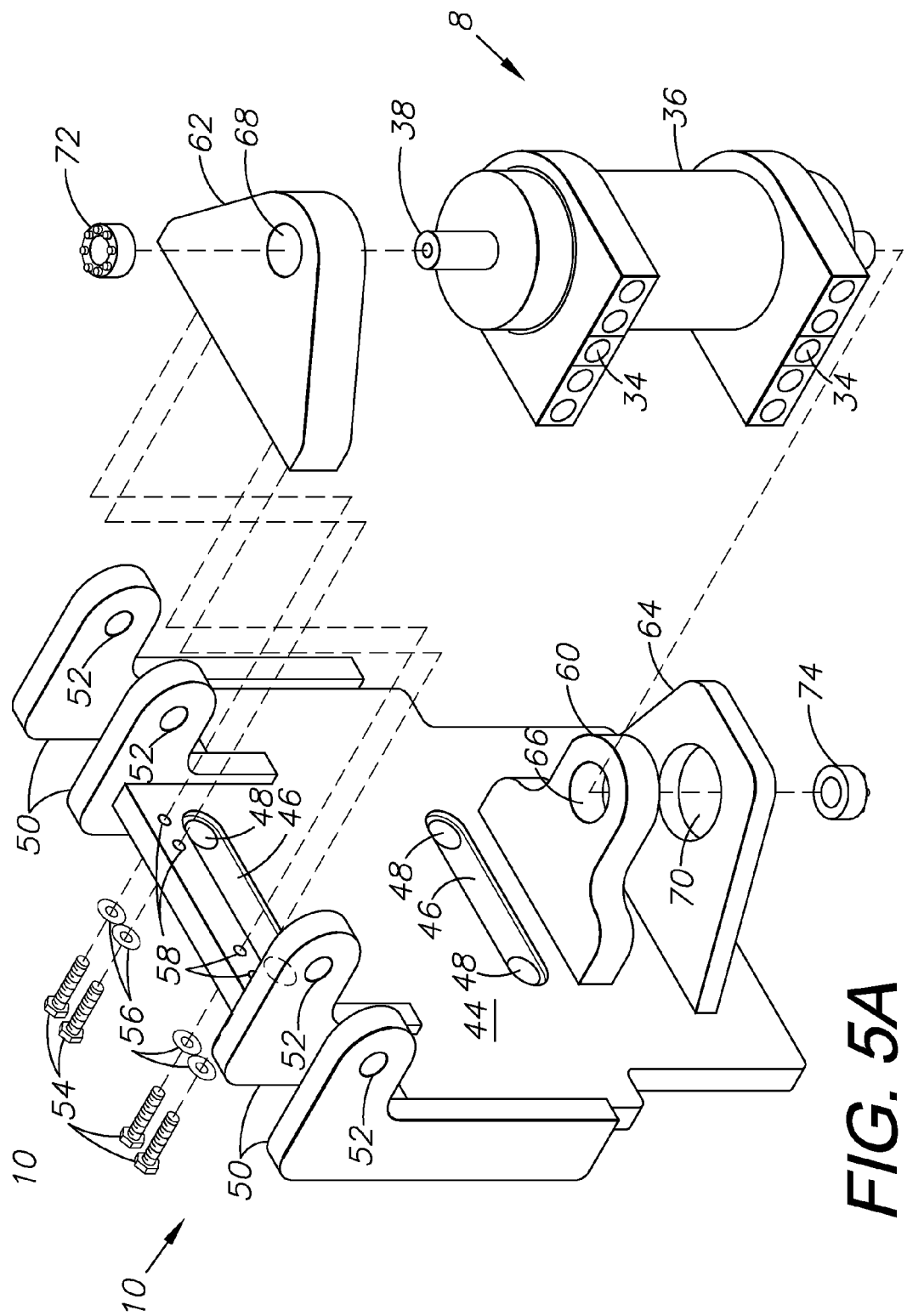
FIG. 5A is an exploded isometric view of the hydraulic steering actuator and a mounting bracket used for connecting the actuator to the front-chassis portion of the forklift.
Figure 7:
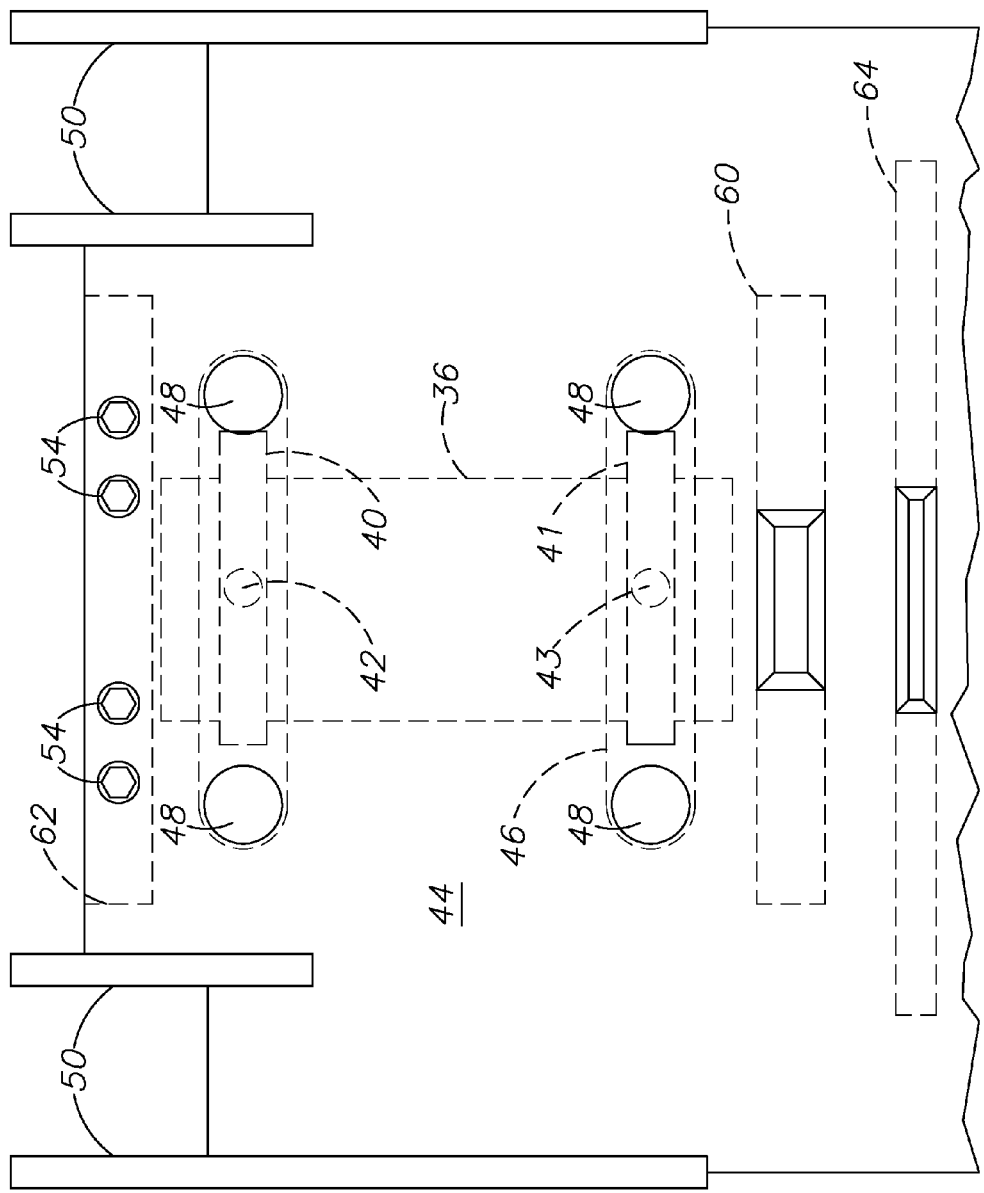
FIG. 7 is an elevational view showing the connection of the mounting bracket and the hydraulic actuator in the direction of arrow 7 in FIG. 6.

FIGS. 5A-7 show the connection of the hydraulic actuator 8 to the mounting bracket 10. As shown in FIG. 5A, the mounting plate 10 is further comprised of a bracket plate 44 including a lower mounting projection 60 with a lower mounting projection opening 66, a bracket base protrusion 64 with a bracket base protrusion opening 70, four tilt-hydraulic connection flanges 50 each including a hinge receiver 52, two recesses 46 each including two hydraulic access receivers 48, and four bolt-holes 58. An upper mounting projection 62 includes an upper mounting projection opening 68 which receives the upper stem of the hydraulic actuator rotator shaft 38. An upper locking assembly 72 secures the upper mounting projection 62 to the hydraulic actuator 8.

The upper mounting projection 62 bolts to the bracket plate 44 via four mounting bolts 54 and associated washers 56. The lower stem of the rotator shaft 38 is secured within the lower mounting projection opening 66 with a lower locking assembly 74. As shown in FIG. 5B, with the hydraulic actuator 8 mounted to the mounting bracket 10, the hydraulic inlet/outlet ports 34 are accessible facing out from the bracket 10. A tilt hydraulic cylinder 28 is connected to each pair of connector flanges 50 via a hinge connection 76.

Figure 8A:
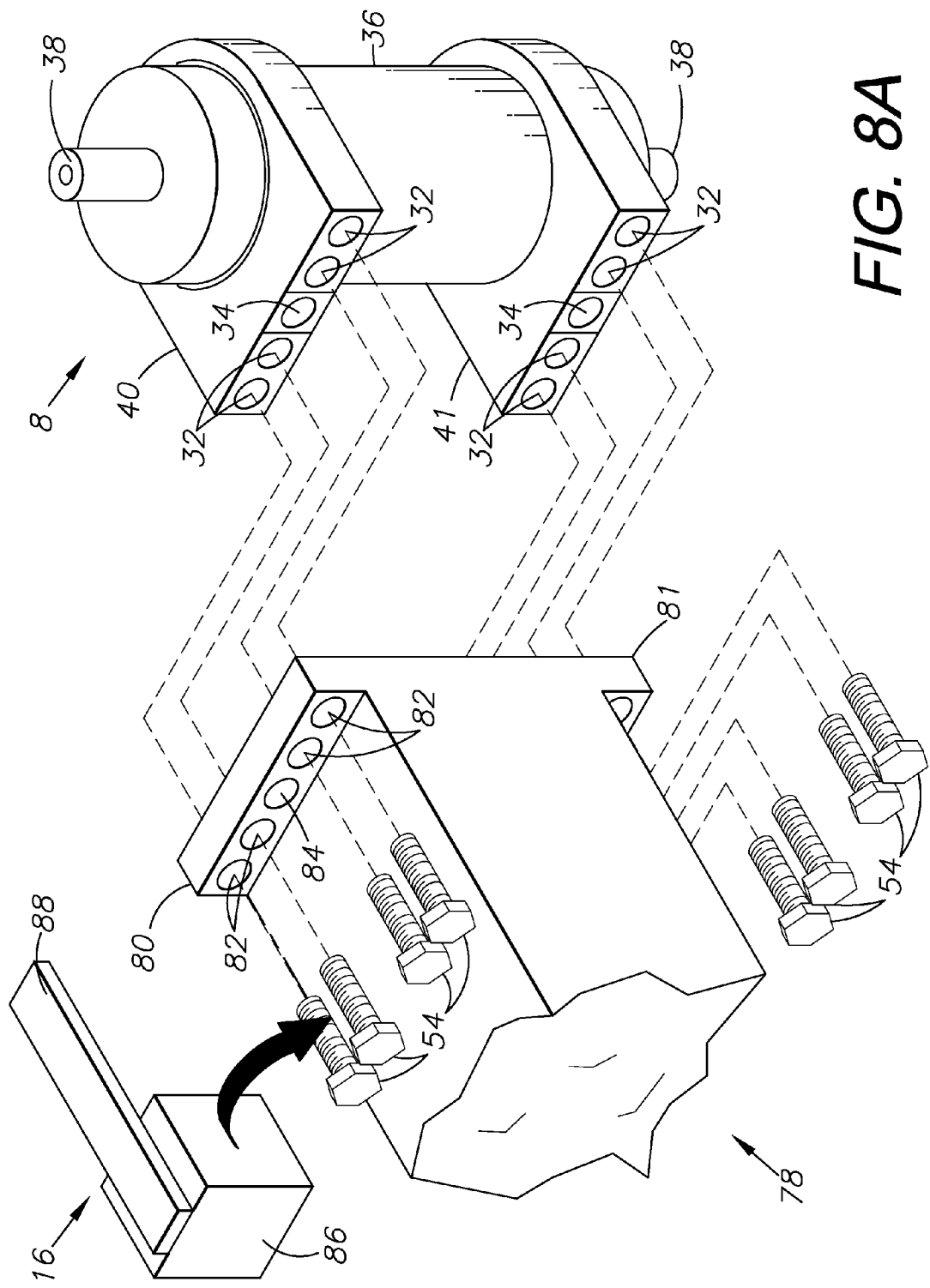
FIG. 8A is an exploded isometric view of the hydraulic actuator and the mounting block used for connecting the actuator to the rear-chassis portion of the forklift.
Figure 9:
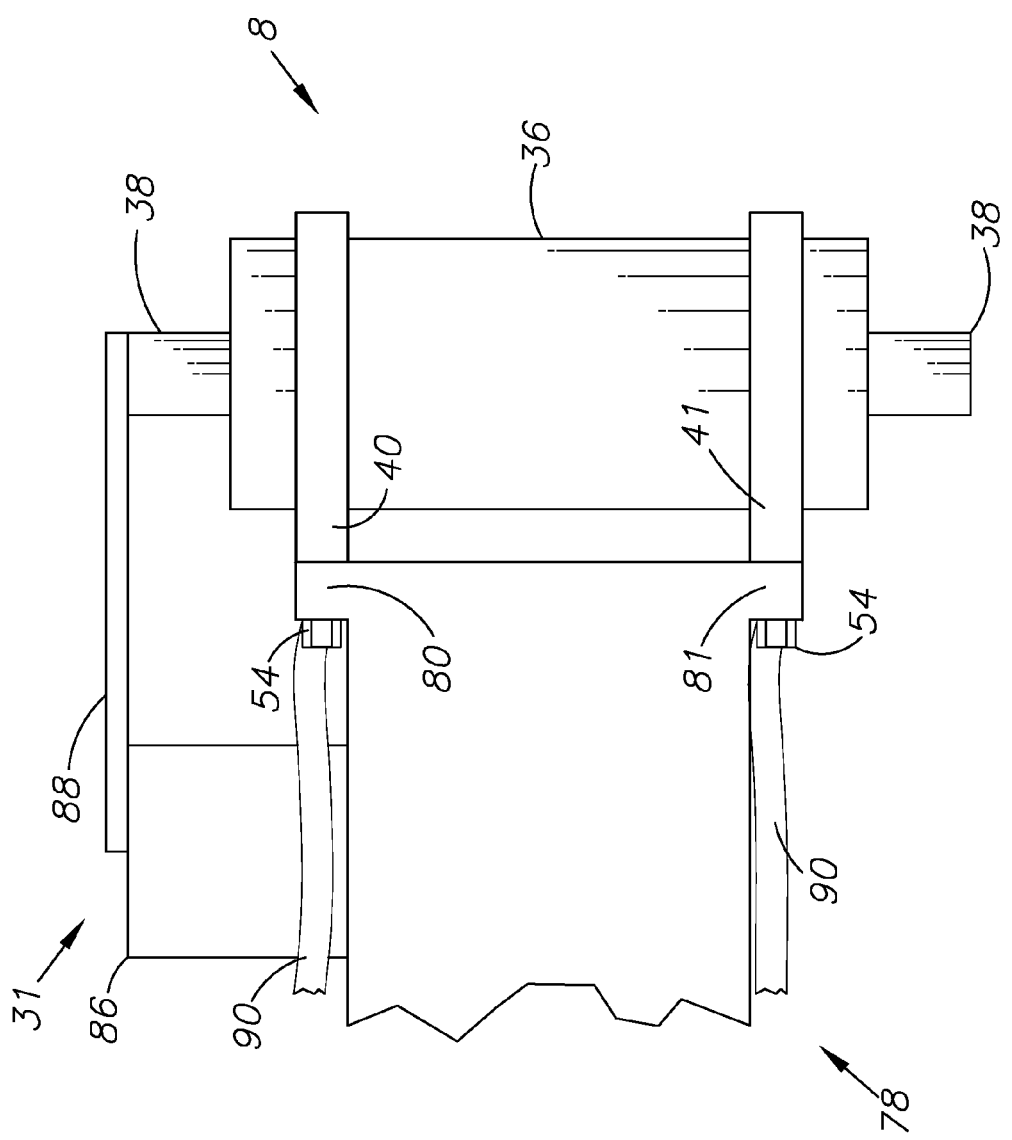
FIG. 9 is a side elevational view of the connection of the mounting block and the hydraulic actuator.
Figure 10:
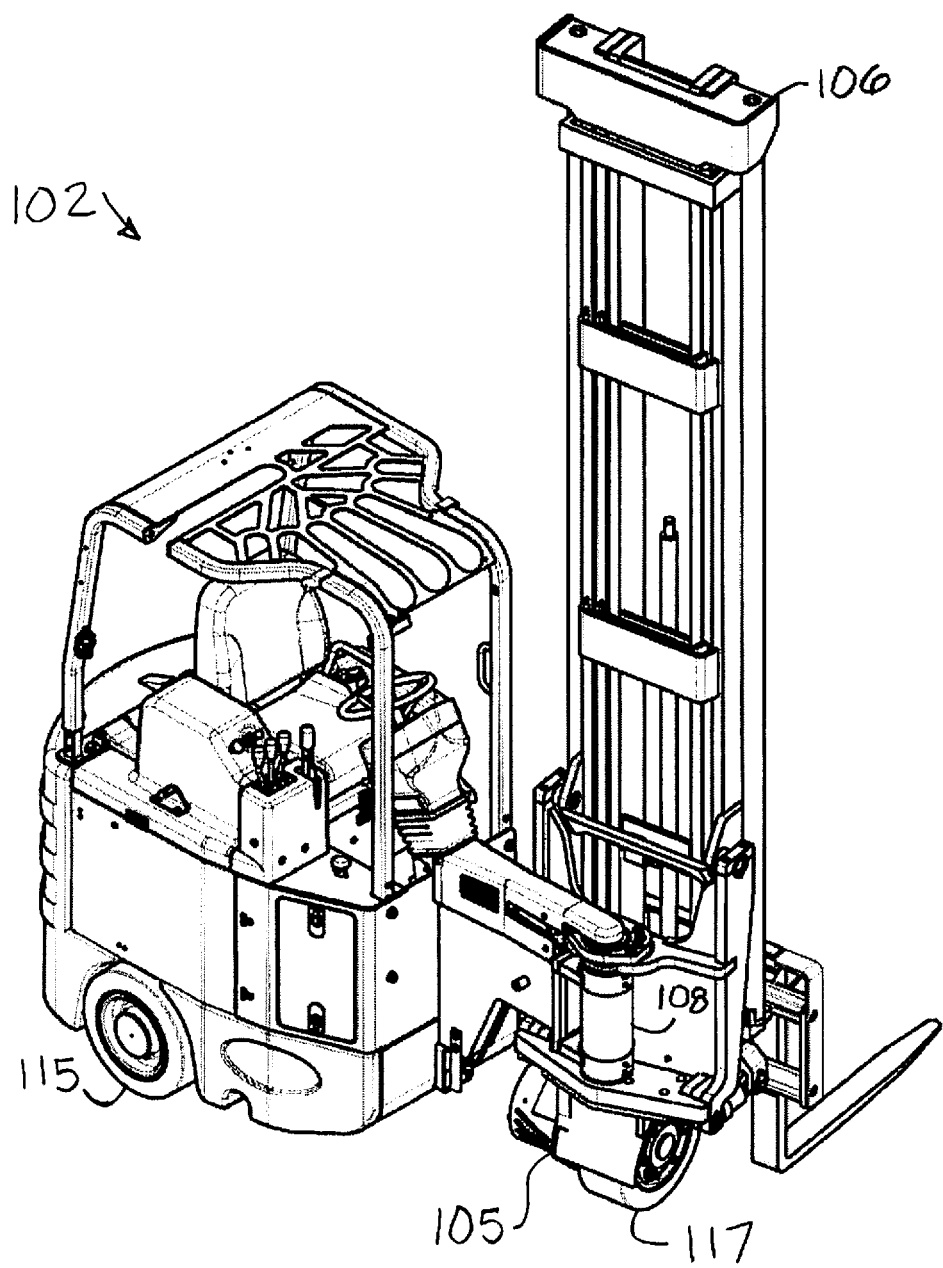
FIG. 10 is an upper, isometric view of a three-wheel forklift comprising an alternative aspect of the invention.
Figure 11:
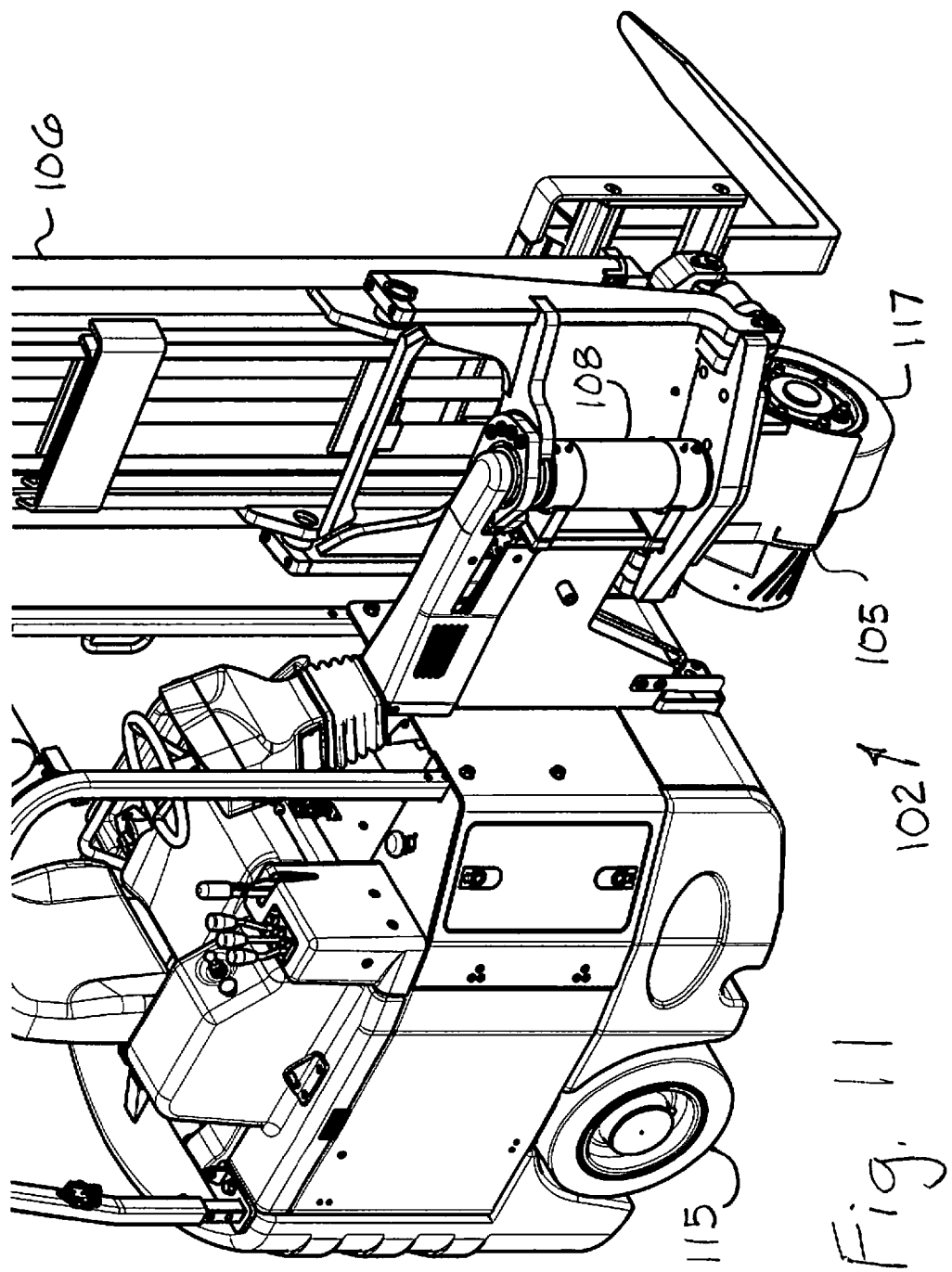
FIG. 11 is an enlarged, isometric view of the alternative aspect forklift, particularly showing the front wheel and the base of the mast.
Figure 12:
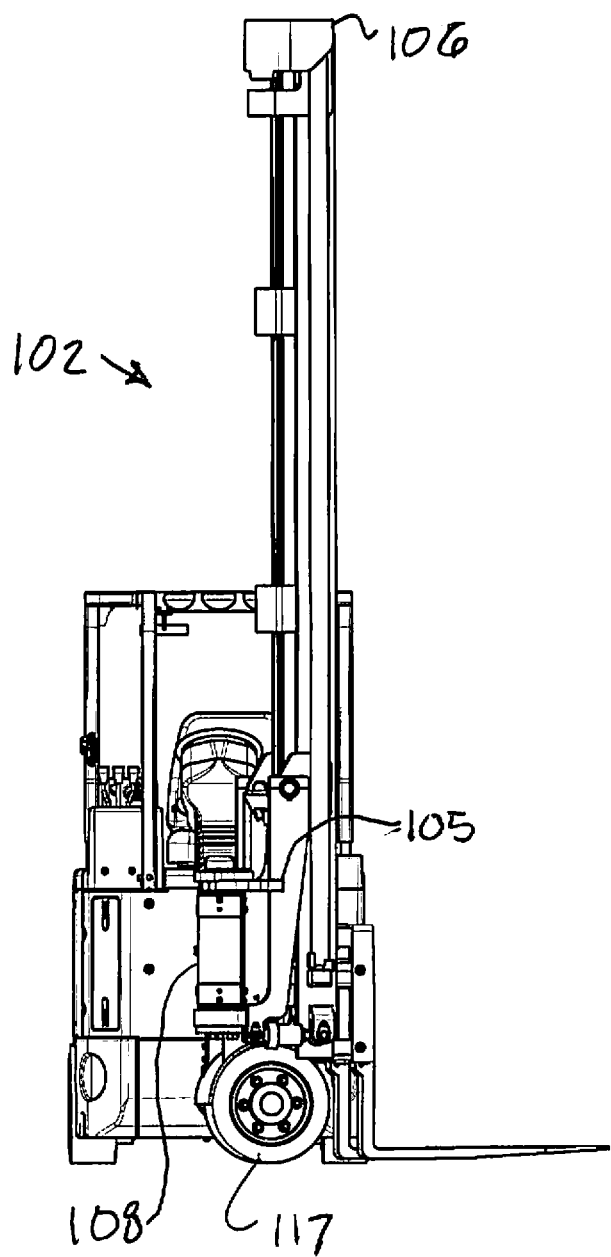
FIG. 12 is a front elevational view of the alternative aspect forklift with the mast turned approximately 90°.
Figure 13:
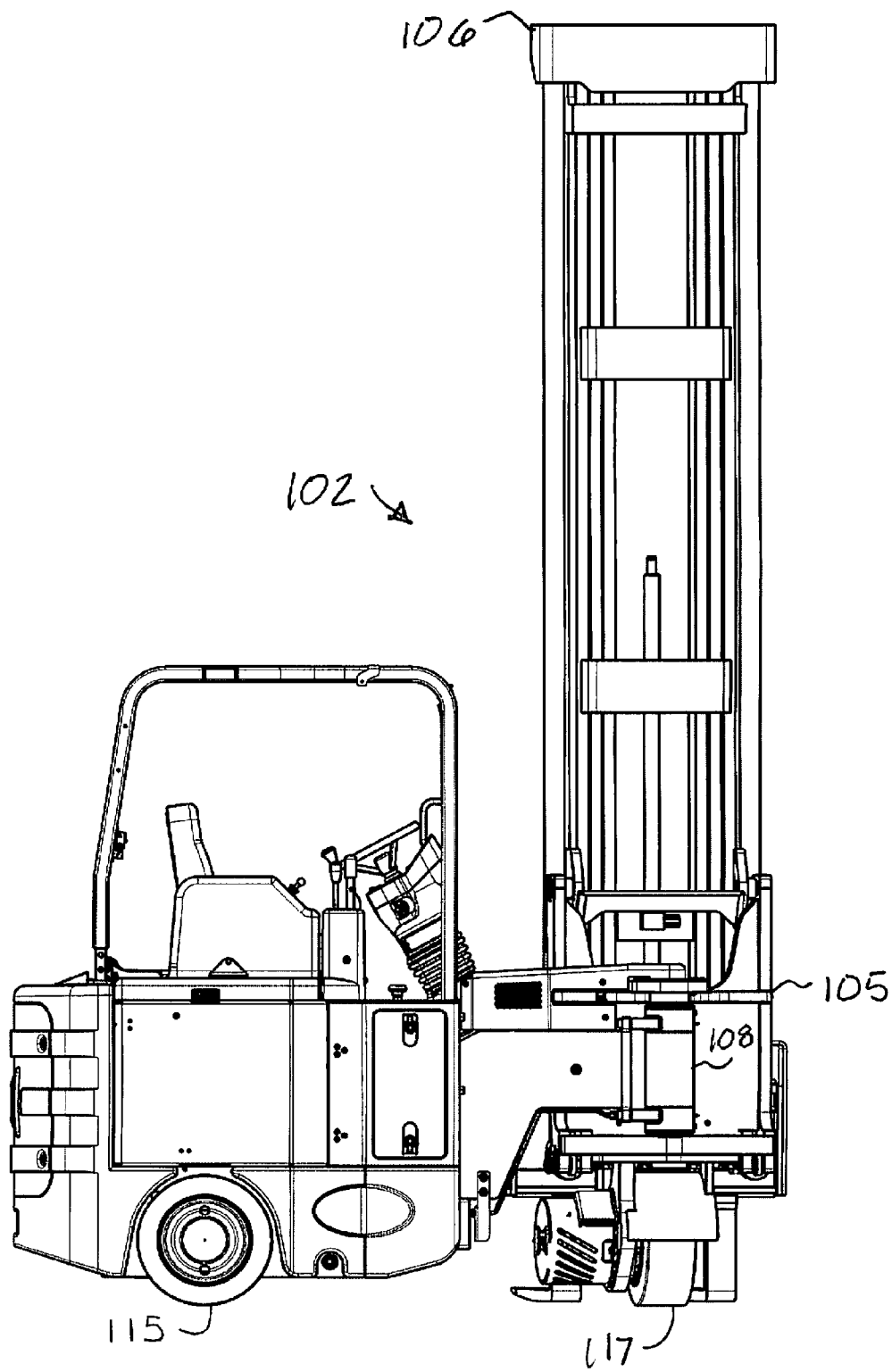
FIG. 13 is a side elevational view of the alternative aspect forklift.
Figure 14:
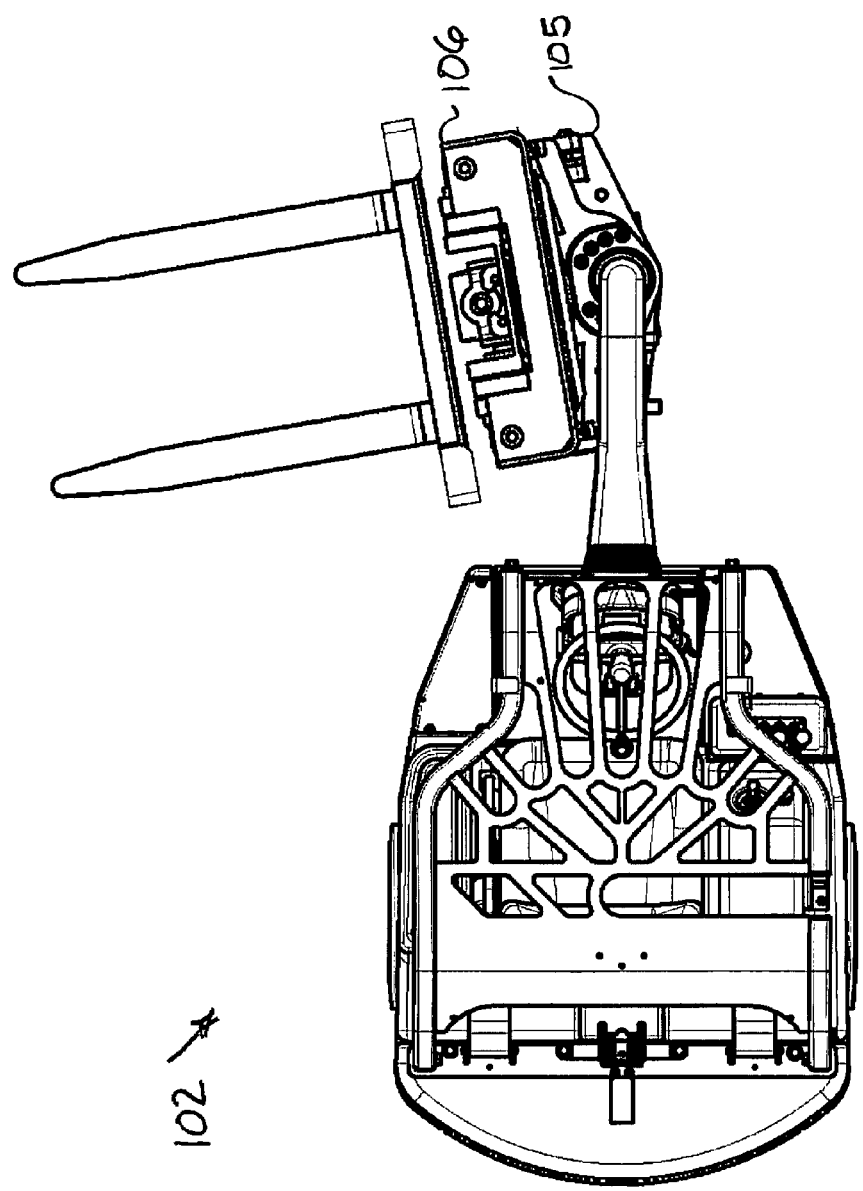
FIG. 14 is a top plan view of the alternative aspect forklift.

FIGS. 8A-9 demonstrate the connection of the hydraulic actuator 8 to the mounting block 78. As shown in FIG. 8A, the mounting block 78 includes an upper mounting flange 80 and a lower mounting flange 81, each including a plurality of bolt holes 82 and a hydraulic port access 84. Mounting bolts 54 connect the hydraulic actuator 8 to the mounting block 78 through the flange bolt holes 82 and the actuator bolt holes 32. A sensor system 31 comprising a sensor body 86 and a sensor arm 88 is mounted to the top face of the mounting block 78. The arm 88 interacts with the hydraulic actuator 8 to determine the rotation angle of the actuator 8.

As shown in FIGS. 8B and 9, hydraulic hoses 90 are fed through the hydraulic port accesses 84 and connected to the hydraulic actuator's hydraulic inlet/outlet ports 34. The hydraulic hoses 90 connect to the hydraulic subsystem 13 located in the rear-chassis portion, and travel through the actuator 8 to the various hydraulically powered components located in the front-chassis portion 5.

III. Operation of the Hydraulic Steering Actuator 8 and the Forklift Truck 2

In an embodiment of the present invention, an operator positioned in the operator's seat 20 in the rear-chassis portion 3 controls the motion of the forklift truck 2 by powering the rear wheels 15. Using the steering controls 24, the operator turns the front-chassis portion 5 by rotating the hydraulic actuator 8, turning the front wheels 17 and directing the forklift truck 2 in the process.

The operator also controls the tilt of the mast 6 and the lift of the fork 4 using the fork controls 26. The tilt of the mast 6 is controlled through the hydraulic system. The hydraulic hoses 90 connect to the hydraulic actuator 8, from which the hydraulic tilt cylinders 28 are fed. These hydraulic cylinders 28 allow the entire mast 6 and the fork 4 to tilt away from or towards the rear-chassis portion 3 of the forklift truck 2. If the operator requires the fork 4 to be maneuvered beneath a piece of inventory, the operator can tilt the mast and the fork 4 forward, guide the truck toward the object, and then tilt the mast 6 and the fork 4 backwards, resulting in the inventory object being lifted from the ground and onto the fork 4.

The rotator shaft 38 of the hydraulic actuator 8 is drivingly connected to and causes the front-chassis portion 5 to rotate according to the steering wheel movements by the operator. The upper and lower locking assemblies 72, 74 create a rigid connection between the rotator shaft 38 and the upper 62 and lower 60 mounting projections of the mounting bracket 10. An example of the locking assemblies 72, 74 is the Ringfeder Locking Assembly RfN 7013 manufactured by Ringfeder GMBH of Germany. The forklift front wheels may optionally turn in the same direction as the actuator rotator shaft 38 to assist in turning the forklift truck 2.

A forklift truck comprising a modified or alternative aspect of the present invention is shown in FIGS. 10-14 and is generally designated by the reference numeral 102. The forklift truck 102 is similar to the forklift truck described above, except that a single forward wheel 117 is provided on a front chassis portion 105 mounting a mast 106, in lieu of the forward wheels 17 mounted on the front chassis portion 5 described above. The three-wheel configuration of the forklift truck 102 provides different operating characteristics, such as a shorter overall length with the mast 106 turned 90°, as shown in FIGS. 10-14. Moreover, the three-wheel configuration effectively utilizes the load-distributing configuration provided by the single forward wheel 117 in cooperation with the rear wheels 115, which form a load-bearing triangle defined by the relative positions of the three wheels. Another advantage relates to accommodating uneven and out-of-level operating surfaces, upon which the three-wheel forklift truck 102 can effectively balance and distribute the weight. An actuator 108 operates in a similar manner to the actuator 8 described above.

It will be appreciated that the articulated forklift truck can be used for various applications not described herein. Moreover, the articulated forklift truck can be compiled of additional elements or alternative elements to those mentioned herein, while providing similar results.

Having thus described the invention, what is claimed as new and desired to be secured by Letters Patent is:

1. A steering actuator system for a forklift including a front section with a single wheel and a mast mounting a vertically movable load connector, a rear section with wheels and said front and rear sections being connected at an articulated connection with a generally vertical rotational axis, which steering actuator system comprises:

a hydraulic actuator including a rotating hydraulic steering motor with a coaxial driveshaft and a pair of hydraulic fluid ports;

said hydraulic actuator including upper and lower actuator flanges mounted on said hydraulic steering motor and each including a respective hydraulic fluid port;

a forklift front section mounting bracket connected to said forklift front section;

a forklift rear section mounting bracket connected to said forklift rear section;

said actuator flanges being connected to one of said front and rear section mounting brackets; and said driveshaft being connected to the other of said mounting brackets.

2. The steering actuator system according to claim 1 wherein said driveshaft is generally aligned with the forklift front section vertical rotational axis.

3. The steering actuator system according to claim 1, which includes:

a hydraulic piston-and-cylinder unit connected to said front section mounting bracket and said mast;

said forklift front section including a chassis mounting said mast and said front section mounting bracket; and said piston-and-cylinder unit being adapted for tilting said mast relative to said forklift front section.

4. The steering actuator system according to claim 1, which includes:

said single wheel comprising a steering wheel;

a hydraulic system connected to said steering actuator and said steering wheel; and said steering wheel hydraulically controlling the rotation of said hydraulic steering motor.

5. A steering actuator system for a forklift including a front section with a single wheel and a mast mounting a vertically movable load connector, a rear section with wheels and said front and rear sections being connected at an articulated connection with a generally vertical rotational axis, which steering actuator system comprises:

a hydraulic actuator including a rotating hydraulic steering motor with a coaxial driveshaft and a pair of hydraulic fluid ports;

said driveshaft being generally aligned with the forklift front section vertical rotational axis;

said hydraulic actuator including upper and lower actuator flanges mounted on said hydraulic steering motor and each including a respective hydraulic fluid port;

a forklift front section mounting bracket connected to said forklift front section;

a forklift rear section mounting bracket connected to said forklift rear section;

said actuator flanges being connected to one of said front and rear section mounting brackets;

said driveshaft being connected to the other of said mounting brackets;

a hydraulic piston-and-cylinder unit connected to said front section mounting bracket and said mast;
said forklift front section including a chassis mounting said mast and said front section mounting bracket;
said piston-and-cylinder unit being adapted for tilting said mast relative to said forklift front section;
said single wheel including a steering wheel;
a hydraulic system connected to said steering actuator and said steering wheel; and
said steering wheel hydraulically controlling the rotation of said hydraulic steering motor.

\* \* \* \* \*